(12) United States Patent
Sharma et al.

(10) Patent No.: US 11,595,358 B2
(45) Date of Patent: Feb. 28, 2023

(54) TWO-WAY SECURE CHANNELS WITH CERTIFICATION BY ONE PARTY

(71) Applicant: EMC IP Holding Company LLC, Hopkinton, MA (US)

(72) Inventors: Anurag Sharma, Cedar Park, TX (US); Yedidia Atzmony, Zichron Yaakov (IL); Shoham Levy, Ra'anana (IL); Joji John, Bangalore (IN); Eric Dequin, Montigny le Bretonneux (FR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/224,630

(22) Filed: Apr. 7, 2021

(65) Prior Publication Data

US 2022/0329570 A1    Oct. 13, 2022

(51) Int. Cl.
*H04L 29/06* (2006.01)
*H04L 9/40* (2022.01)

(52) U.S. Cl.
CPC .................................. *H04L 63/04* (2013.01)

(58) Field of Classification Search
CPC ................. H04L 63/04; H04L 63/0823; H04L 9/0825; H04L 9/3263; H04L 9/3265; H04L 9/3268
See application file for complete search history.

(56) References Cited

U.S. PATENT DOCUMENTS

| 11,246,032 B1* | 2/2022 | Maass | H04L 9/0866 |
| 2016/0127353 A1* | 5/2016 | Thomas | H04L 9/006 |
| | | | 713/156 |
| 2017/0012786 A1* | 1/2017 | Gallagher | H04L 63/062 |
| 2017/0033935 A1* | 2/2017 | Clark | H04L 9/3265 |

(Continued)

OTHER PUBLICATIONS

U.S. Appl. No. 17/224,651, entitled, "Two-Way Secure Channels Between Multiple Services Across Service Groups", filed concurrently herewith.

(Continued)

*Primary Examiner* — Joseph P Hirl
*Assistant Examiner* — Chi D Nguy
(74) *Attorney, Agent, or Firm* — Ryan, Mason & Lewis, LLP (57) ABSTRACT

Two-way secure channels are provided between two parties to a communication with certification being provided by one party. One method comprises providing, by a first entity that provides a certificate authority, a first signed certificate to a second entity, wherein the first signed certificate is signed by the certificate authority and wherein the second entity generates a first request to sign a second certificate generated by the second entity, wherein the first request is generated by the second entity using a first credential generated by the second entity; receiving, from the second entity, (i) the first request to sign the second certificate, and (ii) the first signed certificate; and providing, in response to the certificate authority verifying the first signed certificate, a second signed certificate, signed by the certificate authority, to the (Continued)

second entity; wherein one or more additional communications between the first entity and the second entity use the two-way channel.

20 Claims, 6 Drawing Sheets

(56) References Cited

U.S. PATENT DOCUMENTS

2020/0050759 A1* 2/2020 Duttachoudhury ... G06F 21/552

OTHER PUBLICATIONS https://www.esecurityplanet.com/networks/how-to-run-your-own-certificate-authority/, downloaded on Mar. 26, 2021.
https://searchsecurity.techtarget.com/definition/private-CA-private-PKI, downloaded on Mar. 26, 2021.
https://www.globalsign.com/en/blog/3-reasons-to-run-an-internal-ca-to-reconsider, downloaded on Mar. 26, 2021.
https://www.securew2.com/blog/creating-private-certificates, downloaded on Mar. 26, 2021.

* cited by examiner

| ONE-TIME CERTIFICATE IDENTIFIER | SCOPE LIMITATIONS | TIME-TO-LIVE (EXPIRATION) |
|---|---|---|
| CERTIFICATE 1 | CSR ONLY | 30 SECONDS |
| ... | | |
| CERTIFICATE N | CSR ONLY | 30 SECONDS |

CREDENTIAL REPOSITORY 400

FIG. 6

TWO-WAY SECURE CHANNELS WITH CERTIFICATION BY ONE PARTY

FIELD

The field relates generally to information processing systems, and more particularly to authentication techniques in such systems.

BACKGROUND

When deploying a software system across an untrusted network, a trusted connection is established between system components, such as servers and clients, to protect against, for example, man in the middle (MITM) and/or spoofing attacks. Trust is often achieved by agreeing on a common certificate authority (CA) to sign a certificate for each system component. A number of protocols allow one entity to identify and trust another entity by evaluating a certificate signed by the common CA.

A need exists for improved techniques for authenticating communications.

SUMMARY

In one embodiment, a method comprises providing, by a first entity of a communication that provides a CA for the communication, a first signed certificate to a second entity of the communication, wherein the first signed certificate is signed by the CA and wherein the second entity generates a first certificate signing request to sign a second certificate generated by the second entity, wherein the first certificate signing request is generated by the second entity using at least a portion of a first credential generated by the second entity; receiving, from the second entity over a two-way channel, (i) the first certificate signing request to sign the second certificate, and (ii) the first signed certificate; and providing, in response to the CA verifying the first signed certificate, a second signed certificate, signed by the CA, to the second entity; wherein one or more additional communications between the first entity and the second entity use the two-way channel.

In some embodiments, the providing the first signed certificate to the second entity further comprises generating a second certificate signing request for the second entity; providing the second certificate signing request to the CA of the first entity; and obtaining the first signed certificate for the second entity from the CA. The first signed certificate for the second entity may comprise (i) a revocable certificate, (ii) a limited purpose certificate that may only be used for one or more defined operations, and/or (iii) a certificate that expires in response to a predefined expiration time or a predefined expiration event. The first signed certificate may be revoked by the first entity in response to the providing the second signed certificate to the second entity.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing two-way secure channels between two parties to a communication with certification being provided by one of the parties.

Initiating trust can be complicated when there is no shared, third party CA. Initiating trust can also be challenging when a third-party CA needs to sign many, often dynamic, certificates, such as for the members of a dynamic cluster. In another example, a third-party CA may need to sign many certificates for a number of clients of a service, e.g., in the case of two-way authentication such as mutual Transport Layer Security, (mTLS). It is often hard, or even impractical, to let the third-party CA sign all of the certificates in these cases.

To initiate trust between entities to a communication without relying on such a third-party CA, an initial point of trust is needed between a first entity and a second entity, such as between a management node and a data control and storage resource node in a storage system. An external entity, such as a person, must be trusted to configure the second entity, and a grace period is required where the parties simply trust a non-validated connection to the second entity. Once the initial trust point is over, there is a secret on the second entity, which now makes the second entity trusted, and enables a two-way authenticated connection between the two nodes.

One or more embodiments of the disclosure provide a protocol for a cluster, with an internal CA, to initiate two-way trust, that reduces the attack surface of the initial trust point, relative to conventional techniques. The attack surface of the initial trust point is reduced by reducing (e.g., minimizing) the time that an initial trust is required, and by sending as little secure data as possible over the network (or by an external entity).

In some embodiments, the first entity, the origin of a cluster that owns the internal CA, generates one-time credentials, such as a private and public key pair with a signed certificate for the second entity. The keys and the certificate have a defined expiration period (or time-to-live). The one-time credentials, in at least some embodiments, can only be used one time, and only for a limited purpose, such as a certificate signing request (CSR), and not for any other operation. During an initial point of trust, the first entity provides the keys and the certificate to the second entity.

The second entity then generates its own pair of private and public keys, in at least some embodiments, as discussed further below in conjunction with FIG. 3. The second entity can also generate a CSR using the generated public key. The second entity then uses the one-time certificate and keys to connect back to the first entity, in order to obtain a signed certificate. Once the second entity receives the newly signed certificate, the connection is terminated, and the one-time set of keys and certificate are revoked by the first entity acting as the CA.

The second entity now has a signed certificate for mTLS. Among other benefits, in some embodiments, the private key of the second entity is not transmitted over the network. In addition, the one-time keys and certificate that were used during the initial point of trust cannot be reused.

One or more embodiments of the disclosure address the bootstrapping of trusted connections that do not rely on a third-party entity (e.g., an external CA that needs to sign all certificates). Existing techniques assume that an external entity from outside of a given system will establish the trust.

In one or more embodiments, a cluster of nodes is self-managed and creates trust between a dynamically changing number of cluster members and non-cluster members (e.g., clients). In at least one embodiment, the exposure of the trust system is limited during the initial point of trust. Unlike other protocols, in which the private key of a second entity is managed by the first entity (or a third party) and must be copied over the network to the second entity, the disclosed techniques generate the private key of the second entity on the host device of the second entity, and the private key is not transmitted across a network.

While one or more embodiments of the disclosure are illustrated herein using communications between two entities in a storage environment, the disclosed techniques for providing two-way secure channels with certification by one of the parties to a communication can be employed for communications between any two parties in any environment, as would be apparent to a person of ordinary skill in the art.

Figure 1:
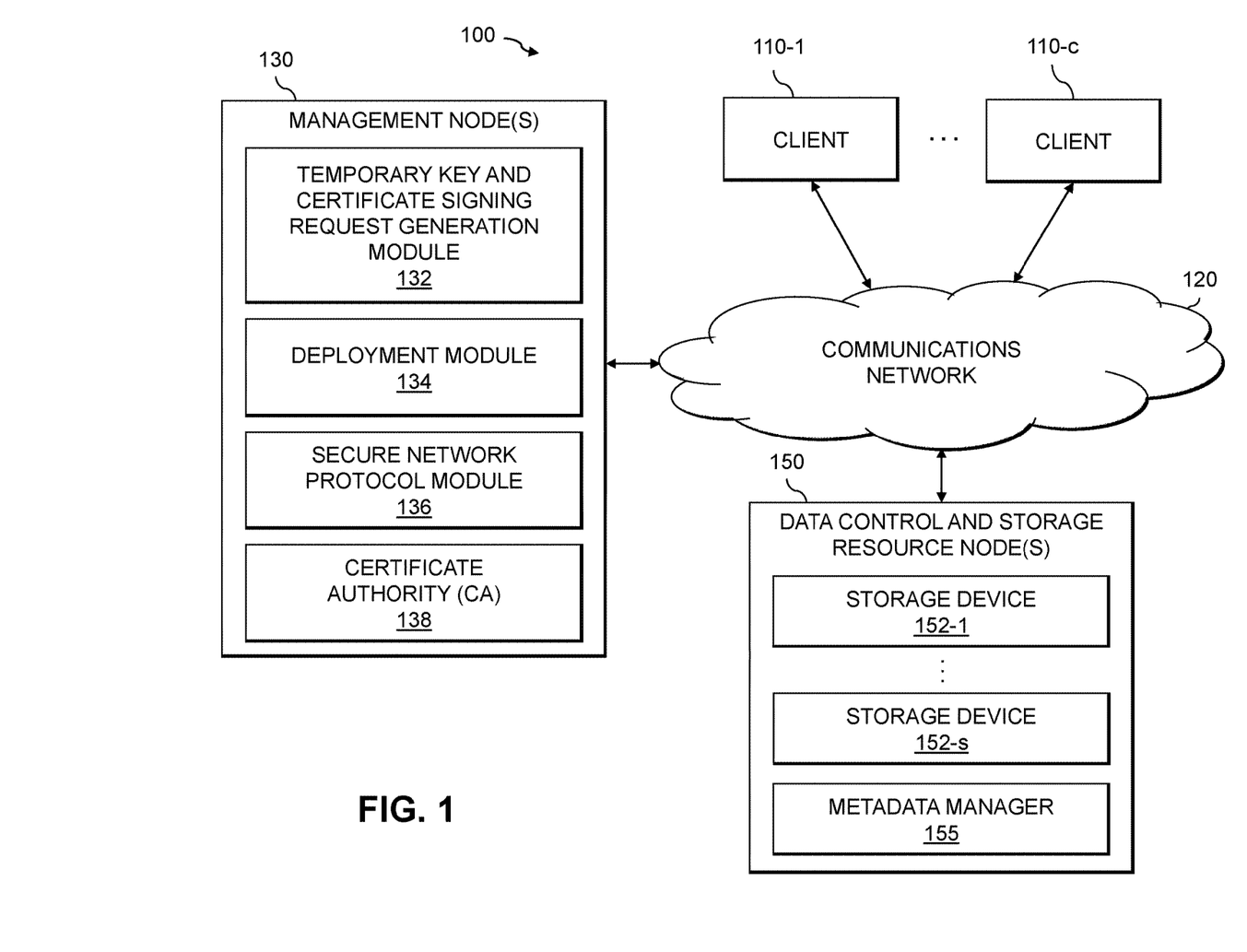
FIG. 1 is a high-level schematic illustration of a computing system comprising a software-defined storage system that provides two-way secure channels between two parties to a communication, according to an exemplary embodiment of the disclosure.

FIG. 1 is a high-level schematic illustration of a computing system comprising a software-defined storage system that provides two-way secure channels between two parties to a communication, according to an exemplary embodiment of the disclosure. More specifically, FIG. 1 schematically illustrates a computing system 100 which comprises a plurality of client nodes 110-1 through 110-c (collectively referred to as client nodes 110), a communications network 120, one or more management nodes 130 and one or more data control and storage resource nodes 150.

In at least some embodiments, one or more of the management nodes 130 may be implemented as a Kubernetes management cluster. The data control and storage resource nodes 150 may comprise a software-defined storage control system (not shown in FIG. 1). As shown in FIG. 1, each of the data control and storage resource nodes 150 comprise a plurality of storage devices 152-1 through 152-s (collectively referred to as storage devices 152) and a metadata manager (MDM) 155. The storage devices 152 may be implemented, for example, as storage data servers (SDSs). The MDM 155 can be configured in some embodiments with one or more members on one or more servers. The MDM 155 can be on a same data control and storage resource node 150 as one or more of the storage devices 152, or on at least one separate and distinct data control and storage resource node 150.

The client nodes 110 include various types of applications that issue data input/output (I/O) requests to storage volumes. For example, the client nodes 110 may include user applications, server applications, database applications, virtual machines and containers. The client nodes 110 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data control and storage resource nodes 150 comprise direct-attached storage (DAS) resources (e.g., internal and/or external storage resources), wherein the storage devices 152 are virtually pooled into shared block storage by the control system. For example, the storage devices 152 include the same type, or a combination of different types of persistent storage devices (e.g., physical block devices) such as hard disk drives (HDDs), solid-state drives (SSDs) (e.g., flash storage devices), peripheral component interconnect express (PCIe) flash cards, or other types and combinations of non-volatile memory. The data control and storage resource nodes 150 may be directly connected to the management node 130 through, e.g., a host bus adapter, and using suitable protocols such as ATA (AT Attachment), SATA (Serial ATA), eSATA (external Serial ATA), non-volatile memory express (NVMe), SCSI, and SAS. In an exemplary embodiment, the storage devices 152 include both HDD and SSD storage devices. As is known in the art, SSD storage devices provide faster storage performance than HDD devices.

While FIG. 1 generally depicts the software-defined storage environment having a single management node 130, it is to be understood that in other embodiments, the system 100 of FIG. 1 can implement a cluster of two or more management nodes 130 (e.g., hundreds of management nodes), wherein each management node 130 deploys its own control system. In this instance, the control system of each server node converts the local storage resources (e.g., DAS resources) of the server node into block storage and contributes the block storage to the server cluster to implement a server-based storage area network (SAN) (e.g., a virtual SAN), wherein each server node is part of a loosely coupled server cluster which enables "scale-out" of the software-defined storage environment.

In the software-defined storage environment of FIG. 1, for purposes of discussion, the term "node" or "management node" as used herein refers to a single management node (e.g., one management node 130) which comprises physical block devices (e.g., HDD devices and SSD devices). The control system exposes abstractions of block devices (e.g., virtual block devices). For example, a virtual block device can correspond to a volume of a storage pool. Each virtual block device spans across any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

The control system is a component of the software-defined storage environment shown in FIG. 1. In some embodiments, the software-defined storage environment comprises other components such as data clients, which are not specifically shown in FIG. 1. The control system comprises a software layer that is deployed on one or more management nodes 130 and configured to provision, orchestrate and manage the physical data control and storage resource nodes 150. For example, the control system implements methods that are configured to create and manage storage pools by aggregating capacity from the physical storage devices 152 (e.g., virtual pools of block storage).

The control system supports the virtualization of storage by separating the control and management software from the hardware architecture. The control system is configured to abstract storage access services from the underlying storage hardware to thereby control and manage I/O requests issued by the client nodes 110, as well as to support networking and connectivity.

As shown in FIG. 1, the management node 130 comprises a temporary key and certificate signing request generation module 132, a deployment module 134, a secure network protocol module 136, and a CA 138. Generally, the temporary key and certificate signing request generation module 132 generates temporary credentials for one or more of the data control and storage resource nodes 150 (or portions thereof, such as one or more services of a given data control and storage resource node 150), the deployment module 134 deploys one or more of the data control and storage resource nodes 150 (or portions thereof) and the secure network protocol module 136 facilitates the provisioning of two-way secure channels where the certification is performed by one of the parties to a communication (e.g., management node 130).

It is to be appreciated that this particular arrangement of modules 132 134, 136 and CA 138 illustrated in the management node 130 of the FIG. 1 embodiment is presented by way of example only, and alternative arrangements can be used in other embodiments. For example, the functionality associated with modules 132, 134, 136 and CA 138 in other embodiments can be combined into a single module, or separated across a larger number of modules. As another example, multiple distinct processors can be used to implement different ones of modules 132, 134, 136 and CA 138 or portions thereof. In some embodiments, the CA 138 may be implemented on a separate and distinct node than other portions of the management node 130.

At least portions of one or more of the modules 132, 134, 136 and CA 138 may be implemented at least in part in the form of software that is stored in memory and executed by a processor. An exemplary process utilizing one or more of modules 132, 134 and 136 for an example management node 130 in computing system 100 will be described in more detail with reference to, for example, FIGS. 3 and 5.

On the client-side, a storage data client (SDC) may be deployed in each host application server which hosts one or more of the client nodes 110 that require access to the block devices exposed and managed by the control system. The SDC exposes block devices representing the virtual storage volumes that are currently mapped to that host. In particular, the SDC serves as a block driver for a client (server) to access the block storage that is managed by the control system. The SDC provides the operating system or hypervisor (which runs the SDC) access to the logical block devices (e.g., volumes). The SDCs have knowledge of which control systems (e.g., control system) hold its block data, so multipathing can be accomplished natively through the SDCs. Metadata managers manage the SDC to control system data mappings.

As noted above, computing system 100 comprises a software-defined storage system that implements the disclosed techniques for providing two-way secure channels with certification by one of the parties to a communication. In one exemplary implementation, the software-defined storage system may be implemented using the Dell EMC PowerFlex® software-defined storage solution, commercially available from Dell Technologies. Other software-defined storage systems include the ScaleIO™ software-defined storage product and/or the VxFlex OS® software-defined storage product.

Figure 2:
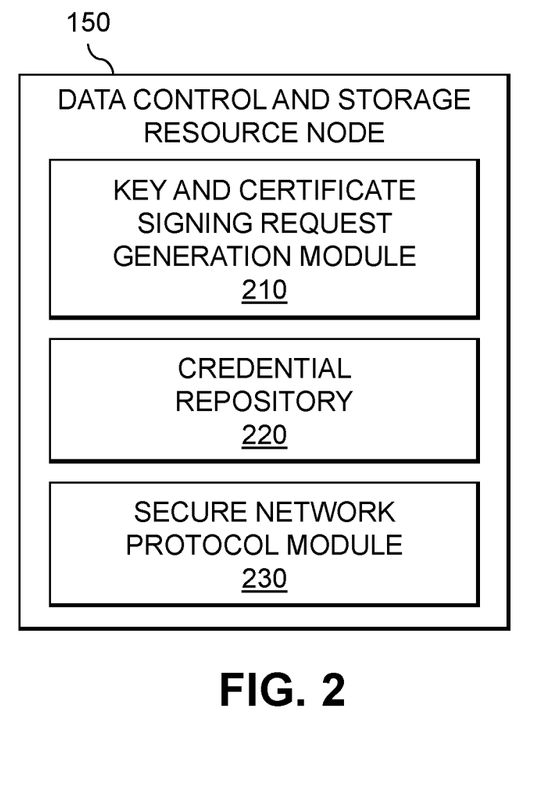
FIG. 2 illustrates an exemplary data control and storage resource node of FIG. 1, in further detail, according to some embodiments.

FIG. 2 illustrates an exemplary data control and storage resource node 150 of FIG. 1, in further detail, according to some embodiments. As shown in FIG. 2, the data control and storage resource node 150 comprises a key and certificate signing request generation module 210, a credential repository 220, and a secure network protocol module 230. Generally, the key and certificate signing request generation module 210 communicates with the management node 130 to receive its own temporary credentials using a process discussed further below in conjunction with FIG. 3. In addition, the exemplary credential repository 220 stores the temporary and long-term credentials of the data control and storage resource node 150. The secure network protocol module 230 facilitates the provisioning of two-way secure channels where the certification is performed by one of the parties to a communication (e.g., a management node 130).

It is to be appreciated that this particular arrangement of modules 210, 230 illustrated in the data control and storage resource node 150 of the FIG. 2 embodiment is presented by way of example only, and alternative arrangements can be used in other embodiments. For example, the functionality associated with modules 210, 230 in other embodiments can be combined into a single module, or separated across a larger number of modules. As another example, multiple distinct processors can be used to implement different ones of modules 210, 230 or portions thereof.

At least portions of one or more of the modules 210, 230 may be implemented at least in part in the form of software that is stored in memory and executed by a processor.

An exemplary process utilizing one or more of modules 210, 230 for an example data control and storage resource node 150 in computing system 100 will be described in more detail with reference to, for example, FIGS. 3 and 5.

Figure 3:
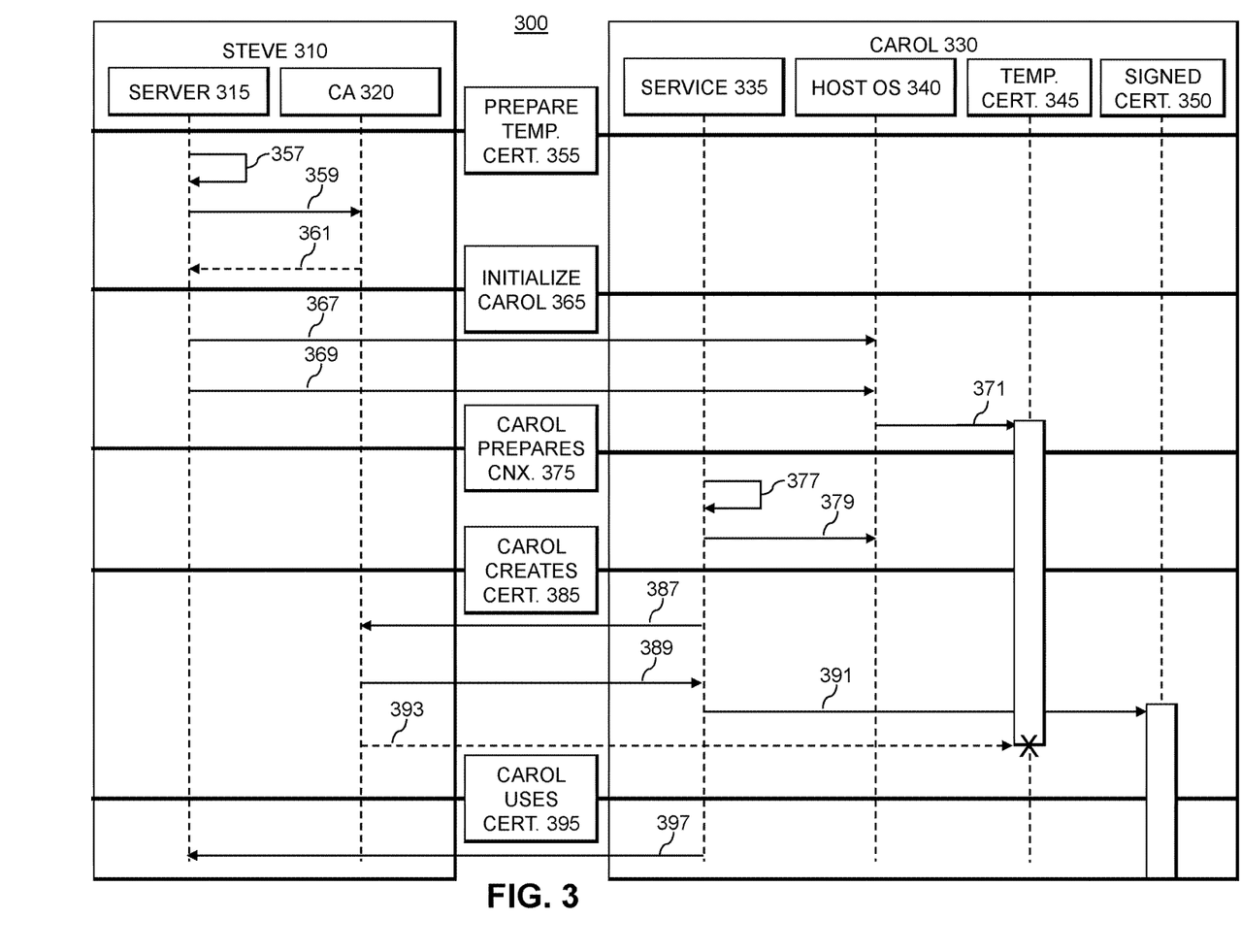
FIG. 3 illustrates an exemplary communication diagram for providing a two-way secure channel between a server and a client, with certification provided by the server, according to an embodiment of the disclosure.

FIG. 3 illustrates an exemplary communication diagram 300 for providing a two-way secure channel between a server 315 of an entity Steve 310, and a service 335 of an entity Carol 330, with certification provided by the server 315, according to an embodiment of the disclosure. In the example of FIG. 3, Steve 310 has an initial, trusted, system server 315. Steve 310 acts as the CA authority of the system using CA 320. The server 315 of Steve 310 needs to prepare a temporary certificate in step 355 to set up a two-way secure connection with the service 335 of Carol 330. The server 315 knows the IP address and login credentials of Carol 330. The server 315 generates a set of temporary private and public keys in step 357, and signs a temporary certificate for Carol 330 using the CA 320 in steps 359 and 361. In at least some embodiments, the certificate has a short expiration period (temporary public and private key pair and certificate), and can only be used for CSR signing requests, with no other cluster operations allowed.

Steve 310 then initializes Carol in step 365. The server 315 opens a secure connection (e.g., a Secure Shell (SSH)) to Carol's host (device) OS 340 using the IP address and host credentials of Carol 330, providing the initial point of trust. The initial connection to Carol 330 may not be verified, since there may or may not be a common third-party CA, but the connection will be encrypted in at least some embodiments since the connection will use a secure protocol (e.g., SSH).

The server 315 deploys Carol 330 as a cluster member in step 367, and the server 315 uses the initial trust in step 369 to put the following files on the host OS 340 of Carol 330: Steve's own CA certificate, Steve's IP address, and the temporary public and private key pair accompanied by the temporary Carol certificate, signed by Steve's CA 320. Carol's host OS 340 then stores the temporary Carol certificate 345 in step 371.

The server 315 is now ready to accept a single mTLS connection from the Carol service 335, for the purpose of signing Carol's CSR. Carol 330 is ready to initiate an mTLS connection to the Steve server 315. In case there was no connection from Carol 330, and the temporary Carol certificate expires, the whole trust initialization procedure is aborted, and must start over again.

Carol 330 prepares the connection in step 375 by having the Carol service 335 create a set of private and public keys, and a CSR, in step 377, and obtaining the temporary keys and certificate in step 379 from the host OS 340.

Carol 330 creates her certificate in step 385 by having the Carol service 335 connect to Steve 310 using a two-way authenticated protocol in step 387, such as an mTLS connection (e.g., using her temporary certificate and temporary private key). Carol asks the CA 320 of Steve 310, over the secure connection, to sign her new CSR. The CA 320 of Steve 310 returns to the Carol service 335 a new Carol signed certificate 350 in step 389 and immediately closes the connection. The Carol service 335 stores the new Carol signed certificate 350 in step 391.

The temporary certificate of Carol 330 cannot be used anymore and is immediately revoked by the CA 320 of Steve 310 in step 393. In case another connection attempt is tried using the temporary certificate of Carol 330, now revoked, Steve 310 immediately revokes the newly signed Carol certificate, alerts the system operator, and the trust initialization procedure is aborted.

Carol now has a permanent system certificate in step 395, and Steve 310 and Carol 330 can now safely communicate in step 397 using the two-way secure, mTLS connection. Steve 310 may repeat the same procedure with as many other entities (e.g., clients) as needed.

When it is time for Carol 330 to renew her certificate, Carol 330 can use any common method against Steve 310, as the system's CA 320, to renew it. A common method is for Carol 330 to generate a new CSR and connect to Steve 310, serving as the CA 320, to sign it, while the old certificate is still valid.

Figure 4:
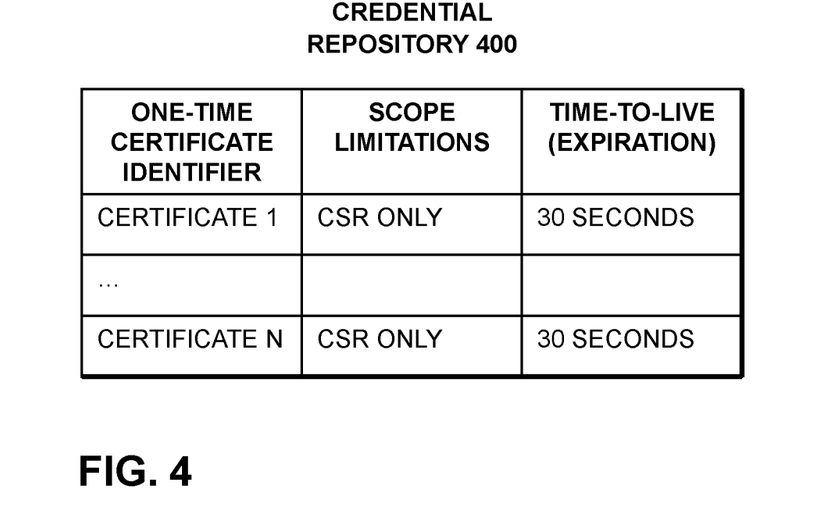
FIG. 4 illustrates an exemplary credential repository of a client, according to one or more embodiments of the disclosure.

FIG. 4 illustrates an exemplary credential repository 400 of an entity, such as the service 335 of FIG. 3, according to one or more embodiments of the disclosure. As shown in FIG. 4, the credential repository 400 comprises entries for N different certificates. Each certificate is identified by a certificate identifier and indicates any scope limitations and an optional time-to-live (e.g., expiration time). In one or more embodiments, the indicated scope limitations, if any, define a limited purpose for the corresponding certificate, for example, by indicating that the corresponding certificate may only be used for one or more defined operations, such as a CSR. In addition, the time-to-live parameter may define that the corresponding certificate automatically expires in response to occurrence of a predefined expiration time and/or occurrence of a predefined expiration event.

Figure 5:
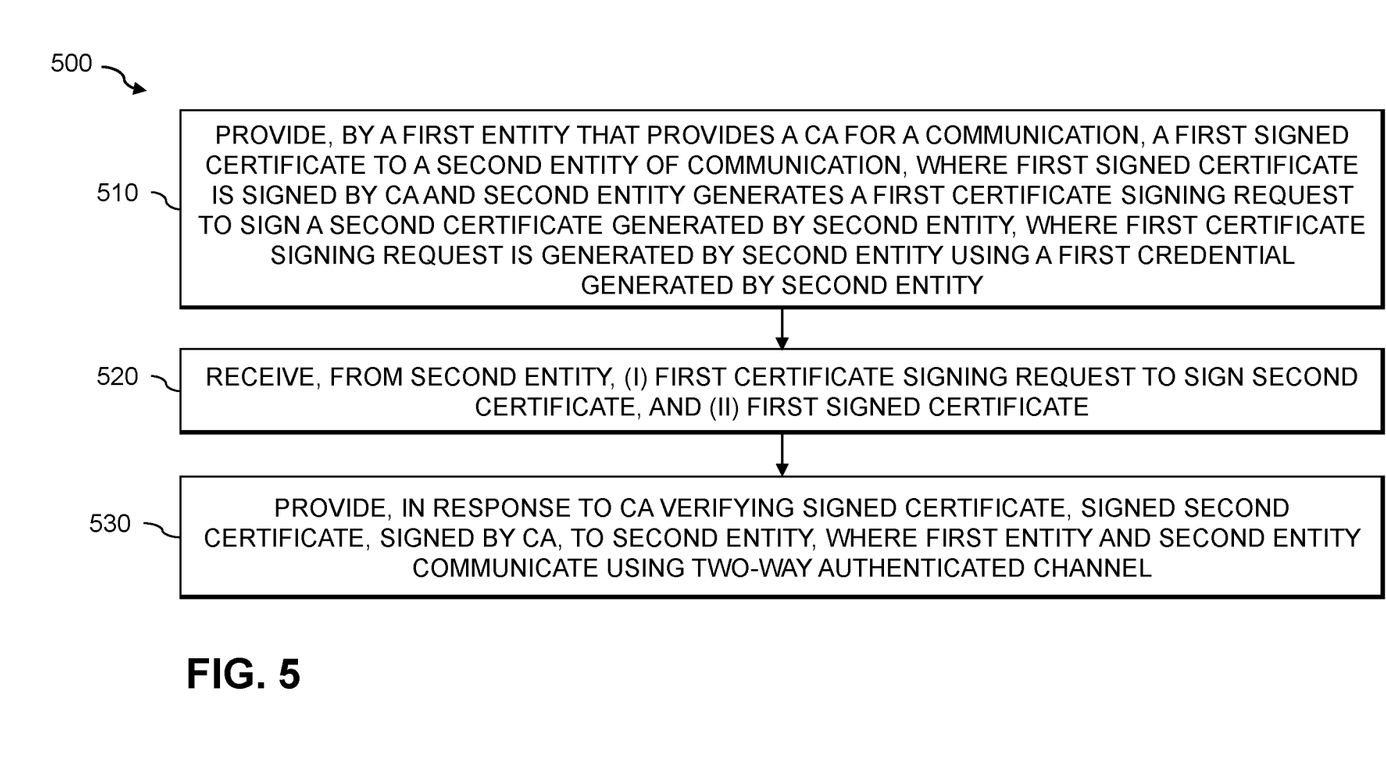
FIG. 5 illustrates an exemplary process for providing two-way secure channels between two parties to a communication where the certification is provided by one of the parties, according to an embodiment.

FIG. 5 illustrates an exemplary process 500 for providing two-way secure channels between two parties to a communication where the certification is provided by one of the parties, according to an embodiment. As shown in FIG. 5, in step 510, a first entity of a communication that provides a CA for the communication provides a first signed certificate to a second entity of the communication, where the first signed certificate is signed by the CA and the second entity generates a first certificate signing request to sign a second certificate generated by the second entity, where the first certificate signing request is generated by the second entity using at least a portion of a first credential generated by the second entity.

In step 520, the first entity receives, from the second entity over a two-way channel, (i) the first certificate signing request to sign the second certificate, and (ii) the first signed certificate. Thereafter, the first entity provides, in response to the CA verifying the first signed certificate, a second signed certificate, signed by the CA, to the second entity in step 530, where the first entity and the second entity communicate using the two-way authenticated channel.

In some embodiments, the first signed certificate is based at least in part on a private key shared by the first entity and the second entity, and the second signed certificate is based at least in part on a private key of the second entity.

Among other benefits, the first credential is not communicated between the first and second entities, in at least some embodiments. The first entity and the second entity may be part of a cluster having a dynamically changing number of members. The first signed certificate may be based at least in part on a one-time secret of the second entity and the second signed certificate may be based at least in part on a second secret of the second entity.

In at least some embodiments, the first signed certificate for the second entity can be provided by generating a second certificate signing request for the second entity; providing the second certificate signing request to the CA; and obtaining the first signed certificate for the second entity from the CA. The first signed certificate can be provided to the second entity by providing a credential of the second entity, a certificate of the first entity and/or a network address of the first entity to the second entity.

The first signed certificate for the second entity may comprise (i) a revocable certificate, (ii) a limited purpose certificate that may only be used for one or more defined operations, and/or (iii) a certificate that expires in response to a predefined expiration time or a predefined expiration event.

One or more remedial actions may be performed in response to detecting an anomalous use of the signed certificate. For example, the predefined remedial steps and/or mitigation steps to address the detected anomalous use of the signed certificate may comprise the transmission of an alert or alarm to the client node 110, the management node 130, and/or a data control and storage resource node 150 for important or suspicious events; isolating, removing, quarantining, limiting permissions, analyzing, and deactivating one or more of the client node 110, the management node 130 and/or one or more files, accounts or aspects of the client node 110, the management node 130 or a user; notifying one or more third party systems (such as sending an email, or generating an alert in another system); restricting access of one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the client node 110, the management node 130, one or more data control and storage resource nodes 150, one or more user accounts or other machine associated with the detected anomalous activity In one or more embodiments, the at least one one-time credential for the second entity comprises one or more of a public key/private key pair, an authentication token, and a username/password pair. The first entity may revoke the signed certificate, for example, in response to the providing the second certificate to the second entity.

The particular processing operations and other network functionality described in conjunction with the communication diagram of FIG. 3 and/or the flow diagram of FIG. 5, for example, are presented by way of illustrative example only, and should not be construed as limiting the scope of the disclosure in any way. Alternative embodiments can use other types of processing operations to provide two-way secure channels between two parties to a communication with certification by one of the parties using the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed techniques for providing two-way secure channels between two parties to a communication provide a two-way authenticated connection. While one or more exemplary embodiments are illustrated in the context of mTLS, the disclosed techniques can be employed for any two-way secure protocol or any combination of two-way trust-based protocols, with or without encryption over the wire.

In some embodiments, the disclosed techniques may be employed with asymmetric protocols that use certificates for the first entities (e.g., servers) and authentication tokens for the second entities (e.g., clients), for example. The client token can be obtained using a client certificate, and then the solution proceeds as described above. Alternatively, the client's token can be obtained by supplying a client secret (e.g., a password). In those cases, instead of a temporary client certificate, a temporary client secret is issued that will be replaced by a fixed client secret, when the client first connects.

For example, the disclosed techniques may be employed in an implementation that uses TLS for servers and OAUTH2 for clients (e.g., where the server does not only act as the CA, but also as the authorization and resource owner/server). In addition, the disclosed techniques may be employed in an implementation that uses TLS for servers and OIDC for clients (e.g., where the server does not only act as the CA, but also as the authorization, authentication and resource owner/server). In another variation, TLS may be used for servers and SAML may be used for clients (e.g., where the server does not only act as the CA, but also as the authorization, authentication and resource owner/server). In yet another variation, TLS may be used for servers and HTTP password credentials may be used for clients (e.g., where the server does not only act as the CA, but also as the authentication entity).

Figure 6:
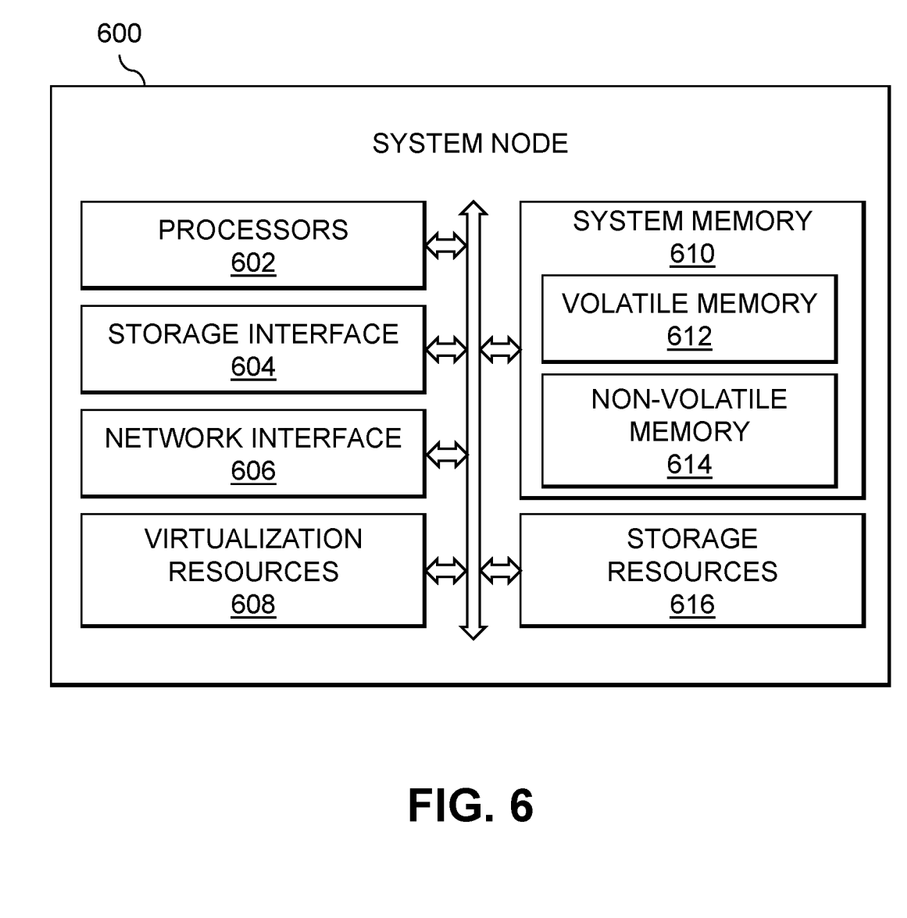
FIG. 6 schematically illustrates a system node which can be implemented in the system of FIG. 1 for hosting a software-defined storage system, or portions thereof, according to an exemplary embodiment of the disclosure.

FIG. 6 schematically illustrates a system node 600 that can be implemented in the system 100 of FIG. 1 for hosting a software-defined storage control system, or portions thereof, according to an exemplary embodiment of the disclosure. In particular, FIG. 6 schematically illustrates an exemplary hardware architecture of a management node 130 and/or a data control and storage resource node 150 of FIG. 1, or portions thereof. The system node 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the system node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, Serial Attached SCSI (SAS), and Fibre Channel. The network interface circuitry 606 enables the system node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 608 can be instantiated to execute one or more services or functions which are hosted by the system node 600. For example, the virtualization resources 608 can be configured to implement the various modules and functionalities of the management node 130 of FIG. 1. In one embodiment, the virtualization resources 608 comprise virtual machines that are implemented using a hypervisor platform which executes on the system node 600, wherein one or more virtual machines can be instantiated to execute functions of the system node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the system node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the system node 600 as well as execute one or more of the various modules and functionalities of the control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the control systems and secure channel provisioning modules that provide two-way secure channels between two parties to a communication comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of a NAND Flash storage device, an SSD device, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the system node 600, and to temporarily store data that is utilized and/or generated by the native OS and application programs and processes running on the system node 600. The storage resources 616 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
providing, by a first entity of a communication, wherein the first entity provides a certificate authority for the communication, a first signed certificate to a second entity of the communication, wherein the first signed certificate is signed by the certificate authority and wherein the second entity generates a first certificate signing request to sign a second certificate generated by the second entity, wherein the first certificate signing request is generated by the second entity using at least a portion of a first credential generated by the second entity;

receiving, by the first entity from the second entity over a two-way channel, (i) the first certificate signing request to sign the second certificate, and (ii) the first signed certificate; and providing, by the first entity, in response to the certificate authority verifying the first signed certificate, a second signed certificate, signed by the certificate authority, to the second entity;

wherein one or more additional communications between the first entity and the second entity use the two-way channel;

wherein the method is performed by at least one processing device comprising a processor coupled to a memory.

2. The method of claim 1, wherein the first signed certificate is based at least in part on a private key shared by the first entity and the second entity, and wherein the second signed certificate is based at least in part on a private key of the second entity.

3. The method of claim 1, wherein the providing the first signed certificate to the second entity further comprises generating a second certificate signing request for the second entity; providing the second certificate signing request to the certificate authority; and obtaining the first signed certificate for the second entity from the certificate authority.

4. The method of claim 1, wherein the providing the first signed certificate to the second entity further comprises providing one or more of a one-time credential of the second entity, a certificate of the first entity and a network address of the first entity to the second entity.

5. The method of claim 1, wherein the first signed certificate for the second entity comprises one or more of (i) a revocable certificate, (ii) a limited purpose certificate that may only be used for one or more defined operations, and (iii) a certificate that expires in response to a predefined expiration time or a predefined expiration event.

6. The method of claim 1, further comprising performing one or more remedial actions in response to detecting an anomalous use of the first signed certificate.

7. The method of claim 1, wherein the first credential comprises one or more of a public key/private key pair, an authentication token, and a username/password pair.

8. The method of claim 1, further comprising revoking, by the first entity, the first signed certificate in response to the providing the second signed certificate to the second entity.

9. The method of claim 1, wherein the first credential is not communicated between the first entity and the second entity.

10. The method of claim 1, wherein the first entity and the second entity are part of a cluster having a dynamically changing number of members.

11. The method of claim 1, wherein the first signed certificate is based at least in part on a one-time secret of the second entity and wherein the second certificate is based at least in part on a second secret of the second entity.

12. An apparatus comprising:
at least one processing device of a first entity of a communication that provides a certificate authority for the communication, wherein the at least one processing device comprises a processor coupled to a memory;
the at least one processing device of the first entity being configured to implement the following steps:
providing a first signed certificate to a second entity of the communication, wherein the first signed certificate is signed by the certificate authority and wherein the second entity generates a first certificate signing request to sign a second certificate generated by the second entity, wherein the first certificate signing request is generated by the second entity using at least a portion of a first credential generated by the second entity;

receiving, from the second entity over a two-way channel, (i) the first certificate signing request to sign the second certificate, and (ii) the first signed certificate; and providing, in response to the certificate authority verifying the first signed certificate, a second signed certificate, signed by the certificate authority, to the second entity;

wherein one or more additional communications between the first entity and the second entity use the two-way channel.

13. The apparatus of claim 12, wherein the providing the first signed certificate to the second entity further comprises generating a second certificate signing request for the second entity; providing the second certificate signing request to the certificate authority; and obtaining the first signed certificate for the second entity from the certificate authority.

14. The apparatus of claim 12, wherein the first signed certificate for the second entity comprises one or more of (i) a revocable certificate, (ii) a limited purpose certificate that may only be used for one or more defined operations, and (iii) a certificate that expires in response to a predefined expiration time or a predefined expiration event.

15. The apparatus of claim 12, further comprising revoking, by the first entity, the first signed certificate in response to the providing the second signed certificate to the second entity.

16. The apparatus of claim 12, wherein the first credential is not communicated between the first entity and the second entity.

17. A non-transitory processor-readable storage medium having stored therein program code of one or more software programs, wherein the program code when executed by at least one processing device, of a first entity of a communication that provides a certificate authority for the communication, causes the at least one processing device to perform the following steps:
providing, by a first entity of a communication that provides a certificate authority for the communication, a first signed certificate to a second entity of the communication, wherein the first signed certificate is signed by the certificate authority and wherein the second entity generates a first certificate signing request to sign a second certificate generated by the second entity, wherein the first certificate signing request is generated by the second entity using at least a portion of a first credential generated by the second entity;

receiving, from the second entity over a two-way channel, (i) the first certificate signing request to sign the second certificate, and (ii) the first signed certificate; and providing, in response to the certificate authority verifying the first signed certificate, a second signed certificate, signed by the certificate authority, to the second entity;

wherein one or more additional communications between the first entity and the second entity use the two-way channel.

18. The non-transitory processor-readable storage medium of claim 17, wherein the first signed certificate for the second entity comprises one or more of (i) a revocable certificate, (ii) a limited purpose certificate that may only be used for one or more defined operations, and (iii) a certificate that expires in response to a predefined expiration time or a predefined expiration event.

19. The non-transitory processor-readable storage medium of claim 17, further comprising revoking, by the first entity, the first signed certificate in response to the providing the second signed certificate to the second entity.

20. The non-transitory processor-readable storage medium of claim 17, wherein the first credential is not communicated between the first entity and the second entity.

* * * * *

UNITED STATES PATENT AND TRADEMARK OFFICE
CERTIFICATE OF CORRECTION

PATENT NO. : 11,595,358 B2
APPLICATION NO. : 17/224630
DATED : February 28, 2023
INVENTOR(S) : Anurag Sharma et al.

It is certified that error appears in the above-identified patent and that said Letters Patent is hereby corrected as shown below:

In the Claims

Column 14, Lines 43-44, in Claim 17, replace "providing, by a first entity of a communication that provides a certificate authority for the communication," with – providing –

Signed and Sealed this
Second Day of May, 2023

Katherine Kelly Vidal
*Director of the United States Patent and Trademark Office*